United States Patent Office 3,838,146
Patented Sept. 24, 1974

3,838,146
CARDENOLIDE- AND BUFADIENOLIDE-3-[2',3'-DIDESOXYGLYCOSIDES] AND PROCESS FOR THEIR PREPARATION
Ulrich Stache, Hofheim, Taunus, Werner Fritsch, Neuenhain, Taunus, Werner Haede, Hofheim, Taunus, Kurt Radscheit, Kelkheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Aug. 10, 1970, Ser. No. 62,712
Claims priority, application Germany, Aug. 29, 1969,
P 19 43 901.1, P 19 43 903.3
Int. Cl. C07c 173/00
U.S. Cl. 260—210.5                               9 Claims

ABSTRACT OF THE DISCLOSURE

Cardenolide- and bufadienolide - 3 - [2',3' - didesoxyglycosides] and corresponding compounds having an oxido group in the 2',3'-position of the glycoside, and a process for making them starting from the corresponding 2',3'-unsaturated compounds by reaction with organic percarboxylic acids or by catalytic hydrogenation. The compounds are useful for the treatment of cardiac insufficiency.

---

The present invention relates to cardenolide- and bufadienolide-3-[2',3'-didesoxyglycosides] of the general formula I

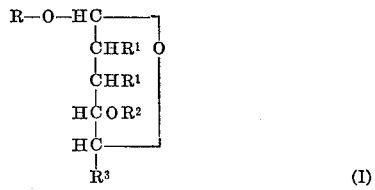

in which R represents a steroid radical of the 3-hydroxycardenolide or 3-hydroxybufadienolide series, $R^1$ taken alone is a hydrogen atom or both $R^1$ taken together stand for an oxido radical, $R^2$ represents an aliphatic, cycloaliphatic, araliphatic or aromatic acyl or alkyl radical or a hydrogen atom, and $R^3$ a hydrogen atom, a methyl radical or the group $CH_2OR^2$.

The present invention further relates to a process for the preparation of these compounds, wherein bufadienolide or cardenolide - 3 - [2',3' - didesoxy - $\Delta^{2'(3')}$-glycosides] of the general formula II

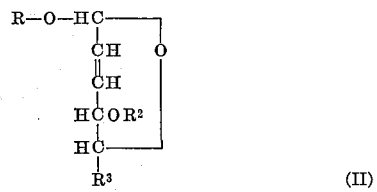

in which R, $R^2$ and $R^3$ have the above meanings, (a) are either reacted with organic percarboxylic acids, or (b) when R is a 3-hydroxycardenolide radical, are catalytically hydrogenated in the presence of metal catalysts. Optionally, when $R^2$ is acyl radical, this acyl radical is further hydrolyzed with alkaline agents, and, when $R^2$ is a hydrogen atom, the OH group is acylated or etherified in known manner.

The following cardenolide-3-[2',3'-didesoxy-$\Delta^{2'(3')}$-glycosides], which can be prepared by reaction of the corresponding 3-hydroxy-steroids with acylated 1,2-glycals according to the process described in Belgian Pat. 731,175, may be used as starting substances: the 3-[2',3'-didesoxy-$\Delta^{2'(3')}$-glycosides] of digitoxigenin, gitoxigenin, digoxygenin, periplogenin, 19-carboxy-methylene-periplogenin-5β-lactone, 19-cyano-methylene-periplogenin, uzarigenin, canarigenin, k-strophanthidin, k-strophantidol, ouabagenin or oleandrigenin, bufalin or hellebrigenin, of the above mentioned general formula II, the glycoside component of which advantageously comprises glucose, rhamnose, mannose or arabinose. Glucose and rhamnose are preferred, the latter in its α-L-form as well as in its β-D-form. In the glycoside component, the radical $R^2$ of the cited general formula II may have the following meanings:

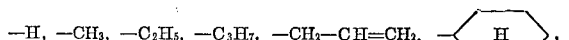
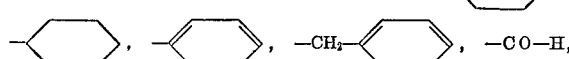
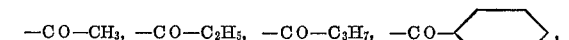
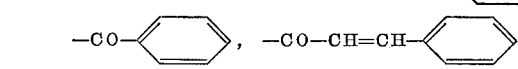

The following organic percarboxylic acids may be used in the reaction: perbenzoic, m-chloroperbenzoic, perphthalic, peracetic, performic acid. The reaction is advantageously carried out in an inert solvent.

As inert solvents, chloroform, methylene chloride, carbon tetrachloride, 1,2-dichloroethane, benzene, toluene or mixtures of said solvents are preferably used.

For carrying out the process of the invention according to (a), the starting substances are dissolved in one of the cited solvents, and from 1 to 10 molar equivalents of the organic per-acid are added at a tempetrature of from −20° to the boiling temperature of the solvent used, preferably at a temperature of from +10° to 30° C. By means of iodometric titration it is possible to follow up the absorption of 1 molar equivalent of percarboxylic acid in the reaction solution. At this moment of complete absorption, the reaction has to be stopped and the product is worked up according to usual methods. For example, excess per-acid as well as newly formed acid is removed either by means of extraction of the organic phase with an aqueous alkali bicarbonate or alkali carbonate solution, or by means of chromatography on neutral or alkaline aluminum oxide. The products according to the process of the invention are obtained in their pure form either by recrystallization from suitable organic solvents or by chromatography and subsequent recrystallization.

For hydrogenation according to the modification (b) of the process of the invention, starting substances are used in which R stands for the 3-hydroxycardenolide radical. Surprisingly, the 2'(3')-double bond is hydrogenated in preference to the 20(22)-double bond of the 17β-butenolide ring, i.e. unexpectedly, partial hydrogenation is possible.

Examples of catalysts for the hydrogenation are palladium, platinum, rhodium, zinc, nickel or iridium catalysts or mixtures of these catalysts. Palladium catalysts, such as palladium black on, palladium on barium or strontium carbonate, are preferably used.

As solvents for the catalytical hydrogenation, for example methylene chloride, chloroform, dichloroethane, tetrahydrofurane, dioxane, methanol, ethanol, propanol, benzene, toluene or mixtures of said solvents may be used.

Catalytic hydrogenation is effected according to usual methods at normal pressure up to about 50 atmospheres, at temperatures between 0 and 70° C., preferably between 20 and 50° C., and using the normal equipment provided for catalytic hydrogenation. It is, however, important to stop the catalytic hydrogenation after absorption of 1 mol equivalent of hydrogen gas, if it does not stop by itself after the absorption of this amount of hydrogen. By following ultraviolet absorption in the range of 207 to 220 mμ) =17β-butenolide ring), the course of the hydrogenation can be controlled.

Subsequently, the product is filtered to remove the catalyst, the filtrate is concentrated and the residue is recrystallized from suitable solvents, which procedure may be preceded by chromatography.

When ester groups are present in the glycoside component of the cardenolide- or bufadienolide-2',3'-didesoxyglycosides obtained according to (a) or (b), it is possible to hydrolyze them to form free alcoholic groups by means of usual hydrolytic processes, for example by hydrolysis with ammonia in methanol or with potassium carbonate in alcohol/water. When alcoholic groups are present in the cardenolide-or bufadienolide-2',3'-didesoxy-glycosides, they may be either acylated, for example by reaction with carboxylic anhydrides or carboxylic halides according to Schotten-Baumann, or etherified, for example by reaction with alkyl halides in the presence of silver compounds.

The products of the invention possess valuable pharmacological properties. They display, for example, cardiotonic effects (positive inotropic effect), as well as diuretic and anti-diarrheal properties. Several products of the invention, for example digitoxigenin-3-L-[2',3' - didesoxy]-rhamnoside, have a positive inotropic effect superior to that of the digitoxigenin-3-L-[2',3'-didesoxy-Δ$^{2'(3')}$]-rhamnoside on which it is based and which, in turn, is already considerably more effective than the therapeutically used digitoxin. These pharmacological findings are very surprising, since up to now it has been assumed [cf. J. Pharm. Sc. 58, 228 (1969)] that the cardio-activity decreases with an increasing degree of desoxygenation in the sugar immediately adjacent to the steroid, as seen from carbon atom 1' toward carbon atom 2'. Similar effects have been observed in those products obtained in the process of the invention, the sugar radical of which contains an epoxy group.

The products obtained in the process of the invention excel by their high oral resorption rate and by few toxic side-effects, thus being highly suitable for the treatment of cardiac insufficiency. As the dose for human beings, up to 3–4 dragées daily are recommended, a dragée containing about 50 to 1000γ of the new compounds.

The products obtained inthe process of the invention are, above all, orally administered in the form of tablets, dragées or capsules. Additionally, normal auxiliaries, for example lactose, starch, magnesium stearate are used. The compounds may also be injected intravenously; as solvents, propylene glycol, physiological sodium chloride solution, and, optionally, further dissolving agents are added.

The following examples illustrate the invention:

EXAMPLE 1

Digitoxigenin-3-L-[2',3'-didesoxy-4'-O-acetyl-rhamnoside]

A solution of 3.7 g. of digitoxigenin-3-L-[2',3'-didesoxy-4'-O-acetyl-Δ$^{2'(3')}$-rhamnoside] in 300 ml. of ethanol is added to a prehydrogenated suspension of 1.5 g. of palladium on calcium carbonate (10%) in 100 ml. of ethanol, and the whole is hydrogenated at 22° C. under normal pressure. After absorption of 1 molar equivalent of $H_2$ (=155 ml.), the hydrogenation stops. The resulting product is filtered to remove the catalyst and the filtrate is concentrated in vacuo. The residual oil is recrystallized from ether/n-hexane. 3.3 g. of digitoxigenin-3-L-[2',3'-didesoxy-4'-O-acetyl-rhamnoside] having a melting point of 230° C. (Kofler heating), and sometimes a conversion point at 125–127° C. are obtained.

Typical infrared bands (measured in KBr): 3495, 1775, 1735 (large), 1615, 1235, 1025, 990 cm.$^{-1}$.

EXAMPLE 2

Digitoxigenin-3-L-[2',3'-didesoxy-rhamnoside]

A solution of 1.2 g. of digitoxigenin-3-L-[2',3'-didesoxy-Δ$^{2'(3')}$-rhamnoside] in 180 ml. of ethanol is hydrogenated with 700 mg. of prehydrogenated Pd/CaCO$_3$ (10%) as described in Example 1, and subsequently worked up. After digesting the resulting oily residue, 840 mg. of digitoxigenin-3-L-[2',3'-didesoxy-rhamnoside] having a melting point of 210–211° C. (Kofler heating) are obtained.

Typical infrared bands (measured in KBr): 3460, 1780, 1735–1750, 1620, 1030, 985 cm.$^{-1}$.

(b) A solution of 2.2 g. of the digitoxigenin-3-L-[2',3'-didesoxy-4'-O-acetyl-rhamnoside] obtained according to Example 1 in 70 ml. of methanol is combined with a solution of 660 mg. of potassium hydrogen carbonate in 6.6 ml. of water, and refluxed for 25 minutes. After cooling, the reaction mixture is poured into 500 ml. of water containing NaCl. The precipitated deposit is filtered off, washed and dried. After recrystallization from acetone/ether, the yield is 1.48 g. of digitoxigenin-3-L-[2',3'-didesoxy-rhamnoside] having the same constants as the product obtained in Example 2a.

EXAMPLE 3

Digitoxigenin-3-L-[2',3'-didesoxy-4'-(O-methyl)-rhamnoside]

(a) A solution of 1 g. of digitoxigenin-3-L-[2',3'-didesoxy-Δ$^{2'(3')}$-4'-(O-methyl)-rhamnoside] in 40 ml. of ethanol and 800 mg. of Pd/CaCO$_3$ (10%), prehydrogenated in 20 ml. of ethanol, are hydrogenated and worked up in the manner described in Example 1. After its crystallization from ether/n-hexane, the oily residue obtained yields digitoxigenin - 3 - L-[2'3'-didesoxy-4'-(O-methyl)-rhamnoside] having a melting point of 148–150° C. (Kofler heating). Typical infrared bands: 3490, 1775, 1750 (shoulder), 1740, 1620, 1100, 1025, 995 cm.$^{-1}$.

(b) 1 g. digitoxigenin-3-L-[2',3'-didesoxy-rhamnoside], prepared according to Example 2, is dissolved in 30 ml. of 1,2-dichloro-ethane and combined with 20 ml. of methylene chloride as well as with 1 g. of silver carbonate. The reaction mixture is refluxed, while stirring, for 7 hours in a nitrogen atmosphere, the condensed liquid passing through a little capsule containing anhydrous calcium sulfate when returning. After completed reaction, the product is filtered to remove the undissolved silver compounds and the solvents of the filtrate are distilled off in vacuo. The resulting only residue is crystallized from ether/n-hexane. Digitoxigenin - 3 - L-[2',3'-didesoxy-4'-(O-methyl)-rhamnoside] having the characteristics given in Example 3a is obtained.

The starting substances are prepared as follows:

(a) Digitoxigenin - 3 - [2',3' - didesoxy-Δ$^{2'}$($^{3'}$)-L-rhamnoside-4'-acetate]: A solution of 1.1 g. of digitoxigenin in 9.6 ml. of absolute tetrahydrofurane is combined with 1.8 ml. of diacetyl-L-rhamnal as well as with 0.07 ml. of phosphorus oxychloride. After 5 hours of stirring at 20–25° C. (a warming of the reaction mixture at a temperature of more than 40° C. must be avoided, since in that case undesired by-products would form which prejudice the yield and which can be separated only with difficulty), the reaction mixture is poured on 50 ml. of water containing NaHCO$_3$ in excess, then completely extracted by means of chloroform. The extracts are washed with water and dried, and the solvents are distilled off in vacuo. A residue of about 2.5 g. of oil remains which crystallizes slowly after triturating with ether. The crystals are filtered off and washed with a bit of cold ether. 1.01 g. of digitoxigenin-3-[2',3'-didesoxy-Δ$^{2'(3')}$-L-rhamnoside-4'-acetate] having a melting point of 137–140° C. (Kofler heating) are obtained. Typical infrared bands: 3515, 1780, 1750, 1735, 1615, 1230, 1020, 740 cm.$^{-1}$ (measured in KBr). Ultraviolet spectrum (methanol): $\lambda_{max}$=216–217 mμ; ε=16,600.

(b) Digitoxigenin - 3 - [2',3' - didesoxy-$\Delta^{2'(3')}$-L-rhamnoside]: In order to hydrolyze the 4'-acetate group, 0.99 g. of the crystallized reaction product obtained is dissolved in 32 ml. of methanol and combined at the boiling point with a solution of 297 mg. of potassium carbonate in 2.97 ml. of water. The reaction mixture is refluxed for 20 minutes, then cooled to 20° C. and poured into 225 ml. of a half-saturated aqueous sodium chloride solution, which causes the separation of crystals. After remaining stationary for 16 hours, the crystals are filtered off, washed with water and dried. 0.84 g. of digitoxigenin-3-[2',3'-didesoxy-$\Delta^{2'(3')}$ - L - rhamnoside] is obtained, having a melting point of 188–184° C. (Kofler heating) which is at 198–201° C. after recrysallization from acetone/ether-n-hexane.

$[\alpha]_D^{20°} = +3.0°$ (chloroform; c.=0.5)

(In a further batch prepared in the same way, the following value was found: $[\alpha]_D^{20°} = +4.6°$).

Typical infrared bands (measured in KBr): 3500, 3400, 3040, 1800 (sometimes as shoulder), 1775, 1720, 1620–1625, 1085, 1020, 990, 735 cm.$^{-1}$.

Ultraviolet spectrum: $\lambda_{max.}=216–217$ m$\mu$; $\epsilon=15,100$ (in methanol).

(c) Digitoxigenin - 3 - L - [2',3'-didesoxy-$\Delta^{2'(3')}$-4-(O-methyl)-rhamnoside]: 2 g. of digitoxigenin-3-L-[2',3'-didesoxy-$\Delta^{2'(3')}$-rhamnoside] are dissolved in 50 ml. of 1.2-dichloroethane and combined with 40 ml. of methyl iodide and 2 g. of silver carbonate. The reaction mixture is refluxed for 6 hours in a nitrogen atmosphere, while stirring; the condensed liquid passing through a little capsule containing anhydrous calcium sulfate when running back. After completed reaction, the product is filtered removing the undissolved silver compounds, and the solvents of the filtrate are distilled off in vacuo. The resulting oily residue is crystallized from ether/n-hexane. The digitoxigenin-3-L-[2',3' - didesoxy - $\Delta^{2'(3')}$-4'-(O-methyl)-rhamnoside] in its crystallized form having a melting point of 178–179° C. (Kofler heating) is obtained.

Typical infrared bands: 3505 (pointed), 1775, 1750 (shoulder), 1735, 1630, 1090, 1030, 1005 cm.$^{-1}$ (measured in KBr).

EXAMPLE 4

A solution of 2 g. of amorphous k-strophanthidin-3-L-[2',3'-didesoxy-$\Delta^{2'(3')}$-rhamnoside-4'-acetate] in 150 ml. of ethanol is added to a prehydrogenated suspension of 900 mg. of palladium on calcium carbonate (10%) in 60 ml. of ethanol, and hydrogenated at 27° C. under normal pressure. After the absorption of 80 ml. of $H_2$ the hydrogenation stops. The product is filtered removing the catalyst and concentrated in vacuo. The remaining oil residue is crystallized from ether. 1.8 g. of k-strophantidin-3-L-[2',3'-didesoxy-rhamnoside-4'-acetate] having a melting point of 249–252° C. (Kofler heating) are obtained which are recrystallized from acetone/methylene chloride/ether (melting point: 258–260° C.). Typical infrared bands (measured in KBr): 3515 (pointed), 2740, 1775, 1750, (shoulder), 1735, 1710, 1620, 1240, 1030, 990 cm.$^{-1}$.

In order to hydrolyze the 4'-acetate group, 1.53 g. of the reaction product just obtained are dissolved in 50 ml. of methanol and combined with a solution of 468 mg. of potassium carbonate in 3.4 ml. of water. After refluxing for 25 minutes, the reaction mixture is poured on water and extracted with chloroform which is then distilled off in vacuo. The residue is crystallized from ether. 1.23 g. of k-strophanthidin-3-L-[2',3'-didesoxy-rhamnoside] are obtained which are recrystallized from acetone/methylene chloride/ether.

Melting point 241–244° C. (Kofler heating).

Typical infrared bands (measured in KBr): 3480, 2740, 1775, 1730, 1615, 1025, 985 cm.$^{-1}$.

EXAMPLE 5

A solution of 1.74 g. of k-strophanthidin-3-L-[2',3'-didesoxy-$\Delta^{2'(3')}$-4'-(O-methyl)-rhamnoside] in 135 ml. of ethanol is added to a prehydrogenated suspension of 800 mg. of palladium on calcium carbonate (10%) in 60 ml. of ethanol, and hydrogenated at 25° C. under normal pressure. After the absorption of about 1 molar equivalent of $H_2$ the hydration stops. The hydrogenation product is filtered to remove the catalyst and the filtrate is concentrated in vacuo. The foam obtained as residue is crystallized by digestion with isopropyl ether. 1.05 g. of pseudocrystallized k - strophanthidin-3-L-[2',3'-didesoxy-4'-(O-methyl)-rhamnoside] having a melting point of 126–128° C. (Kofler heating) are obtained.

Typical infrared bands (measured in KBr): 3490, 2750, 1775, 1740, 1710, 1620, 1090, 1070, 1025, 985 cm.$^{-1}$.

Preparation of the starting compounds:

(a) A solution of 10 kg. of k-strophanthidin in 70 ml. of absolute tetrahydrofurane is combined with 15 ml. of L-rhamnal-3',4'-di-acetate and 20 drops of phosphorus oxychloride. After 5 hours of stirring at 20–25° C. the reaction mixture is poured on water containing sodium bicarbonate in excess, and the product is extracted with chloroform. This chloroform extract is washed with water and dried with sodium sulfate. After distilling off the solvent, an oil is obtained which is subjected to chromatography on silica gel "Merck" (column: 3 x 25 cm.) with at first 1.5 l. of benzene and subsequently 4 l. of ether as the eluant. After distilling the solvent off the ether eluate and digesting with iso-propyl ether, 11.2 g. of amorphous k - strophanthidin-2-L-[2',3'-didesoxy-$\Delta^{2'(3')}$-rhamnoside-4'-acetate] are obtained having the following typical infrared bands (measured in KBr): 3500 (pointed), 2750, 1775, 1740, 1715 (shoulder), 1230, 1030, 1005 (shoulder) cm.$^{-1}$.

(b) For hydrolyzing the 4'-acetate group, a solution of 5.2 g. of k-strophanthidin-3-L-[2',3'-didesoxy-$\Delta^{2',(3')}$-rhamnoside-4'-acetate] in 168 ml. of methanol is combined with a solution of 1.6 g. of potassium carbonate in 15 ml. of water, and the reaction mixture is refluxed for 25 minutes. Subsequently, this mixture is stirred into 1.5 l. water containing sodium chloride, and extracted with chloroform. After distilling off of the chloroform, a foam remains which is digested with iso-propyl ether. 4.4 g. of amorphous k - strophanthidin - 3-L-[2',3'-didesoxy-$\Delta^{2'(3')}$-rhamnoside] having an atypical melting behavior (melting range 150–155° C.) are obtained. Typical infrared bands (measured in KBr): 3470, 2750, 1775, 1735, 1710 (shoulder), 1620, 1020, 990 cm.$^{-1}$.

(c) 2 g. of k-strophanthidin-3-L-[2',3'-didesoxy-$\Delta^{2'(3')}$-rhamnoside] are dissolved in 50 ml. of 1,2-dichloroethane and combined with 40 ml. of methyl iodide and 2 g. of silver carbonate. After refluxing for several hours, while removing water from the distillate, the product is filtered and concentrated. The residue is crystallized with ether. The O-methyl derivate has a melting point of 136–139° C.

EXAMPLE 6

A solution of 1.3 g. of (19-carboxymethylene-periplogenin - 5$\beta$ - lactone)-3-L-[2',3'-didesoxy-$\Delta^{2'(3')}$-rhamnoside-4'-acetate] in 100 ml. of ethanol as well as 20 ml. of tetrahydrofurane are added to a prehydrogenated suspension of 600 mg. of palladium on calcium carbonate (10%) in 60 ml. of ethanol, and hydrogenated at 26° C. under normal pressure. After absorption of 50 ml. of $H_2$ the hydrogenation stops. The product is filtered to remove the catalyst and concentrated in vacuo. The residual oil is precipitated from ether and filtered off. 1.23 g. of amorphous (19 - carboxymethylene-periplogenin-5$\beta$-lactone)-3-L-[2',3'-didesoxy-rhamnoside-4'-acetate] having a melting point of 170–180° C. (Kofler heating) are obtained.

Typical infrared bands (measured in KBr): 3490, 1775, 1750–1710 (large), 1620, 1240, 1030, 995 cm.$^{-1}$.

For hydrolyzing the 4'-acetate group, 1.15 g. of the reaction product just obtained are dissolved in 38 ml. of methanol and combined with a solution of 320 mg. of potassium carbonate in 2.6 ml. of water.

After refluxing for 25 minutes, the reaction mixture is poured on water and extracted with chloroform, which is distilled off in vacuo. The residue is digested with ether. The precipitate obtained is recrystallized from acetone/ether. 742 mg. of (19-carboxymethylene-periplogenin-5$\beta$-lactone) - 3-L-[2',3'-didesoxy-rhamnoside] having a melting point of 200–204° C. (Kofler heating) are obtained.

Typical infrared bands (measured in KBr): 3470, 1775, 1740–1705 (large), 1620, 1025, 980 cm.$^{-1}$.

EXAMPLE 7

A solution of 2 g. of (19-carboxymethylene-periplogenin - 5$\beta$ - lactone) - 3-L-[2',3'-didesoxy$\Delta^{2'(3')}$-4-(O-methyl-rhamnoside] in 130 ml. of ethanol and 20 ml. of tetrahydrofurane are added to a prehydrogenated suspension of 900 mg. of palladium on calcium carbonate (10%) in 60 ml. of ethanol and hydrogenated at 25° C. under normal pressure. After absorption of 1 molar equivalent of $H_2$ the hydrogenation stops. The product is filtered to remove the catalyst and the filtrate is concentrated in vacuo. The residual foam is crystallized by digestion with ether. 1.58 g. of amorphous(19-carboxymethylene-periplogenin - 5$\beta$ - lactone)-3-L-[2',3'-didesoxy-4'-(O-methyl)-rhamnoside] having a melting point of 180–184° C. (atypical, Kofler-heating) are obtained. Typical infrared bands: 3490, 1780, 1750 (shoulder) 1735, 1715 (measured in KBr), 1620, 1100, 1070, 1025, 990 cm.$^{-1}$.

Preparation of the starting substances:

(a) (19 - carboxymethylene-periplogenin-5$\beta$-lactone)-3 - L - [2',3'-didesoxy-$\Delta^{2'(3')}$-rhamnoside]: 3.2 ml. of carbomethoxy - methyl - diethylphosphate are added dropwise, while stirring and cooling, to a suspension of 345 g. of sodium hydride in 19 ml. of absolute tetrahydrofurane. After completed formation of $H_2$, this solution is added to a solution of 2 g. of k-strophanthidin in 30 ml. of absolute tetrahydrofurane. Subsequently, the whole is rinsed with 20 ml. of absolute tetrahydrofurane. After stirring for 3 hours and 35 minutes at 23° C., the reaction mixture is poured on 400 ml. of water, and extracted 5 times with chloroform. The extracts are washed with water and dried, and the solvent is distilled off. The remaining oil is redissolved from acetone/ether. After some time, the product which, in general, is at first obtained again in an oily form, is slowly and completely crystallized. Then, the crystals are filtered off. 1.8 g. of 19-carboxymethylene-periplogenin-5$\beta$-lactone having a melting point of 240–245° C. (to be sintered before) are obtained.

Ultraviolet spectrum: $\lambda_{max}$=215 m$\mu$, $\epsilon$=24 400.

Typical infrared bands: 3460 (often also first band at 3560 cm.$^{-1}$), 1770, 1710–1730 (large), 1615, three weak but typical coherent bands at 1290, 1270 and 1250 cm.$^{-1}$, a band at 2740–2750 cm.$^{-1}$ has disappeared.

(b) 2.8 ml. of diacetyl-1-rhamnal and 4 drops of phosphoroxy oxychloride are added to a solution of 2 g. of 19 - carboxymethylene-periplogenin-5$\beta$-lactone in 14 ml. of absolute tetrahydrofurane (if sparingly soluble in tetrahydrofurane a corresponding amount of absol. methylene chloride can be used). After standing for 4 hours or stirring at 20° C. the darkly colored reaction mixture is poured into 200 ml. of water containing sodium hydrogen carbonate in excess. The product is extracted several times with chloroform, the extracts are washed to neutral, dried, and the solvent is distilled off. The residue so obtained is digested with ether which causes its crystallization. 3.05 g. of 19-carboxymethylene-periplogenin-5$\beta$-lactone-3-[4'-O - acetoxy - 2',3'-didesoxy-$\Delta^{2'(3')}$-L-rhamnoside] having a melting point of 221–231° C. are obtained which show a melting point of 265–267° C. after recrystallization from methylene chloride/ether.

Typical infrared bands: 3485, 1775, 1730–1740, 1615, 1230 (strong) 1020 cm.$^{-1}$.

Ultraviolet spectrum: $\lambda_{max}$=215–216 m$\mu$, $\epsilon$=26 500.

For hydrolysis, 2.2 g. of the reaction product obtained according to (a) and having a melting point of 265–267° C. are dissolved in 70 ml. of absol. methanol. A solution of 660 mg. of potassium bicarbonate in 6.6 ml. of water is added at the boiling point and the reaction mixture is refluxed for 15 minutes. Then, it is poured into 250 ml. of water and is extracted with chloroform. After washing and drying the chloroform, it is distilled off. After digestion of the residue with ether, 1.9 g. of 19-carboxy-methylene-periplogenin - 5$\beta$-lactone-3-[3',3'-didesoxy-$\Delta^{2'(3')}$-L-rhamnoside] are obtained, which have a melting point of 202–208° C. after recrystallization from acetone/ether.

Typical infrared bands: 3450, 1775, 1700–1740 (large), 1615, 1025 cm.$^{-1}$.

Ultraviolet spectrum: $\gamma_{max}$=215–216 m$\mu$, $\epsilon$=23300, $[\alpha]_D^{20°}$=+4° (c.=0.5: HCCl$_3$).

(c) 2 g. of (19 - carboxymethylene - periplogenin - 5$\beta$-lactone) - 3 - L - [2',3' - didesoxy - $\Delta^{2'(3')}$ - rhamnoside] are methylated with 40 ml. of methyl iodide and 2 g. of silver carbonate in 50 ml. of 1,2-dichloroethane, as described in Example 5c for the strophanthidin derivate. The O-methyl derivative having a melting point of 165–170° C. is obtained in the form of a pseudo-crystallized precipitate.

EXAMPLE 8

(a) Digitoxigenin - 3 - D - [2',3' - didesoxy - 4' - O-acetyl - arabinoside]: A solution of 2.5 g. of digitoxigenin-3 - D - [2',3' - didesoxy - 4' - O - acetyl - $\Delta^{2'(3')}$ - arabinoside] in 200 ml. of ethanol is added to a prehydrogenated suspension of 1.0 g. of palladium on calcium carbonate (10%) in 60 ml. of ethanol, and the whole is hydrogenated under normal pressure at 22° C. After absorption of 1 molar equivalent of $H_2$ (=115 ml.), the hydrogenation stops. The resulting product is filtered to remove the catalyst and the filtrate is concentrated in vacuo. The residual oil is crystallized with a bit of di-isopropyl ether. 2.1 g. of digitoxigenin - 3 - D - [2',3' - didesoxy - 4' - O-acetylarabinoside] having a melting point of 218° C. (Kofler heating) are obtained.

Typical infrared bands: 3515, 1775, 1735 (large), 1615, 1240, 1018, 995 cm.$^{-1}$ (shoulder).

(b) The starting substance is prepared as follows: A solution of 3.38 g. of digitoxigenin in 29.5 ml. of absolute tetrahydrofurane is combined, while cooling (internal temperature not above 20° C.), with 5.12 ml. of di-acetyl-D-arabinal as well as with 0.22 ml. of phosphorus oxychloride. After 5 hours of stirring at 20° C., the reaction mixture is poured into 75 ml. of 1N sodium bicarbonate solution, then completely extracted by means of methylene chloride. The extracts are washed with water, dried, and the solvents are distilled off in vacuo and under greatly reduced pressure. A residue of about 8.24 g. of oil is remaining which crystallizes slowly after triturating with ether. The crystals are filtered off and are washed with a bit of cold ether. 3.34 g. of digitoxigenin - 3 - D - [2',3'-didesoxy - 4' - O - acetyl - $\Delta^{2'(3')}$ - arabinoside] having a melting point of 207–215° C. (Kofler heating) are obtained.

Typical infrared bands (measured in KBr): 3500, 1775, 1735 (large), 1620, 1230, 1018, 955 cm.$^{-1}$.

EXAMPLE 9

Digitoxigenin-3-D-[2',3'-didesoxy-arabinoside]

A solution of 0.9 g. of the digitoxigenin-3-D-[2',3'-didesoxy - 4' - O - acetyl - arabinoside] obtained according to Example 8a in 28 ml. of methanol is combined with a solution of 280 mg. of potassium bicarbonate in 3.4 ml. of water and refluxed for 25 minutes. After cooling, the reaction mixture is poured into 170 ml. of water containing NaCl; the precipitate is filtered off, washed and dried. After recrystallization from acetone/ether, 0.68 g. of digitoxigenin - 3 - D - [2',3' - didesoxy - arabinoside] having a melting point of 207–209° C. (Kofler heating) is obtained.

Typical infrared bands (measured in KBr): 3450, 1775, 1735, 1620, 1025, 998 cm.$^{-1}$.

EXAMPLE 10

(a) Digitoxigenin - 3 - L - [2',3' - didesoxy - 4' - O-acetyl - arabinoside]: A solution of 0.7 g. of digitoxigenin-3 - L - [2',3' - didesoxy - 4' - O - acetyl - $\Delta^{2'(3')}$-arabinoside] in 40 ml. of ethanol is added to a prehydrated suspension of 0.35 g. of palladium on calcium carbonate (10%) in 10 ml. of ethanol, and hydrogenated at 22° C. under normal pressure. After the absorption of 1 molar equivalent of $H_2$, the hydrogenation stops. The product is filtered to remove the catalyst and the filtrate is concentrated in vacuo. The residual oil is crystallized with a bit of diisopropyl ether. 0.58 g. of digitoxigenin - 3 - L-[2',3' - didesoxy - 4' - O - acetyl - arabinoside] having a melting point of 188°–192° C. (Kofler heating) is obtained.

Typical infrared bands: (measured in KBr): 3520, 3500, 1775, 1735 (large), 1615, 1240, 1015 cm.$^{-1}$.

(b) The starting substance is prepared as follows: A solution of 2.5 g. of digitoxigenin in 19.5 ml. of absolute tetrahydrofurane is combined, while cooling (internal temperature not above 20° C.) with 4.0 g. of diacetyl-L-arabinal as well as with 0.15 ml. of phosphorus oxychloride. After 5 hours of stirring at 20° C., the reaction mixture is poured into 75 ml. of 1N sodium bicarbonate solution, then completely extracted with methylene chloride. The extracts are washed with water, dried, and the solvents are distilled off in vacuo and under greatly reduced pressure. A residue of about 6.1 g. of oil remains, which slowly crystallizes after trituration with ether. Then the crystals are filtered off and washed with a bit of cold ether. 2.3 g. of digitoxigenin - 3 - L - [2',3' - didesoxy-4'-O - acetyl - $\Delta^{2'(3')}$ - arabinoside] having a melting point of 197–202° C. (Kofler heating) are obtained.

Typical infrared bands (measured in KBr): 3550, 1775, 1735 (large), 1620, 1235, 1020, 760 cm.$^{-1}$.

EXAMPLE 11

Digitoxigenin-3-L-[2',3'-didesoxy-arabinoside]

A solution of 0.3 g. of the digitoxigenin - 3 - L - [2',3'-didesoxy - 4' - O - acetyl - arabinoside] obtained according to Example 10a in 10 ml. of methanol is combined with a solution of 90 mg. of potassium bicarbonate in 1.0 ml. of water and refluxed for 25 minutes. After cooling, the reaction mixture is poured into 60 ml. of water containing NaCl; the precipitate is filtered off, washed and dried. After recrystallization from acetone/ether 0.21 g. of digitoxigenin-3-L-[2',3'-didesoxy-arabinoside] having a melting point of 215–217° C. (Kofler heating) is obtained.

Typical infrared bands (measured in KBr): 3460, 1775, 1735, 1620, 1020, 990 cm.$^{-1}$.

EXAMPLE 12

(a) Digitoxigenin - 3 - L - [2',3' - didesoxy - 2',3'-oxido-arabinoside]: A solution of 150 mg. of digitoxigenin - 3 - L - [2',3' - didesoxy - $\Delta^{2'(3')}$ - arabinoside] in 16 ml. of absolute methylene chloride is combined with 136 mg. of m-chloro-perbenzoic acid and allowed to stand for 24 hours at 20° C. After this time, a iodometric titration shows that the reaction solution has absorbed 1 molar equivalent of per-acid. The reaction mixture is poured into 50 ml. of half-saturated aqueous sodium bicarbonate solution and is extracted several times with methylene chloride. The organic phase is washed with a sodium carbonate solution and then washed to neutral with water. After the distillation, a residue remains which crystallizes after trituration with ether. 217 mg. of digitoxigenin - 3 - L-[2',3' - didesoxy - 2',3' - oxido - arabinoside] are obtained which show a melting point of 215–216° C. (Kofler heating) after recrystallization from methylene chloride/ether.

Typical infrared bands (measured in KBr): 3450, 1780, 1730, 1620, 1060, 1025 cm.$^{-1}$.

(b) The starting substance is prepared as follows: A solution of 1.2 g. of the digitoxigenin-3-L-[2',3'-didesoxy-4'-O-ocetyl-$\Delta^{2'(3')}$-arabinoside] obtained according to Example 10b in 35 ml. of methanol is combined with a solution of 350 mg. of potassium bicarbonate in 4.0 ml. of water and refluxed for 25 minutes. After cooling, the reaction mixture is poured into 200 ml. of water containing NaCl; the precipitate is filtered off, washed and dried. After recrystallization from acetone/ether, 0.78 g. of digitoxigenin-3-L-[2',3'-didesoxy-$\Delta^{2'(3')}$-arabinoside] having a melting point of 226–227° C. (Kofler heating) is obtained.

Typical infrared bands (measured in KBr): 3445, 1775, 1730, 1620, 1020, 760, 745 cm.$^{-1}$.

EXAMPLE 13

(a) Uzarigenin - 3 - L - [2',3' - didesoxy-4'-O-acetyl-rhamnoside]: A solution of 0.4 g. of uzarigenin-3-L-[2',3'-didesoxy - 4'-O-acetyl-$\Delta^{2'(3')}$-rhamnoside] in 25 ml. of ethanol is added to a prehydrogenated suspension of 0.3 g. of palladium on calcium carbonate (10%) in 10 ml. of ethanol, and hydrogenated at 22° C. under normal pressure. After absorption of 1 molar equivalent of $H_2$ the hydrogenation stops. The product is filtered to remove the catalyst and the filtrate is concentrated in vacuo. The residual oil is crystallized with n-hexane. 310 mg. of uzarigenin - 3-L-[2',3'-didesoxy-4'-O-acetyl-rhamnoside] having a melting point of 135–145° C. (amorphous, Kofler heating) are obtained.

Typical infrared bands (measured in KBr): 3500, 1775, 1750, 1730, 1615, 1235, 1025 cm.$^{-1}$.

(b) The starting substance is prepared as follows: A solution of 0.4 g. of uzarigenin in 4 ml. of absolute tetrahydrofurane is combined with 0.64 ml. of di-acetyl-L-rhamnal as well as with 0.02 ml. of phosphoroxy chloride. After 5 hours of stirring at 20–25° C. (a warming of the reaction mixture at a temperature above 40° C. must be avoided, since in that case undesired by-products would form which prejudice the yield and which can be separated only with difficulty), the reaction mixture is poured on 50 ml. of water containing excess NaHCO$_3$ and completely extracted with chloroform. The extracts are washed with water and dried. The solvents are distilled off in vacuo. A residue of about 1.1 g. of oil remains, which yields an amorphous precipitate after trituration with di-isopropyl ether. The precipitate is filtered off and washed with a bit of diisopropyl ether. 410 mg. of uzarigenin - 3 - L - [2',3' - didesoxy - 4'-O-acetyl-$\Delta^{2'(3')}$-rhamnoside] in the form of an amorphous compound are obtained.

Typical infrared bands (measured in KBr): 3505, 1780, 1750 (shoulder), 1735, 1620, 1230, 1025, 735 cm.$^{-1}$.

In a further batch, the product according to the process of the invention was obtained in its pure form by usual chromatography on silica gel ("Merck").

EXAMPLE 14

Uzarigenin-3-L-[2',3'-didesoxy-rhamnoside]

For hydrolysis of the 4'-acetate group, 0.37 g. of the amorphous reaction product obtained as in Example 13 is dissolved in 13 ml. of methanol and combined at the boiling point with a solution of 120 mg. of potassium carbonate in 1.3 ml. of water. The reaction mixture is refluxed for 20 minutes, then cooled to 20° C. and poured on 60 ml. of a half-saturated aqueous sodium chloride solution. Subsequently, the product is completely extracted with chloroform, washed with water and dried. The solvent is distilled off in vacuo. The residual foam is subjected to chromatography on silica gel ("Merck") (Column: 18 x 2 cm.). Elution is carried out with methylene chloride:methanol, first at a ratio of 99:1 and then of 95:5. After concentration of the latter eluate, uzarigenin - 3 - L - [2',3'-didesoxy-rhamnoside] having a melting point of 207–210° C. is obtained from ether.

Typical infrared bands (measured in KBr): 3500, 3085, 1780, 1735, 1615, 1030, 980 cm.$^{-1}$.

$$[\alpha]_D^{20°} = -54.2° \quad (CH_3OH)$$

EXAMPLE 15

Digitoxigenin-3-L-[2',3'-didesoxy-2',3'-oxido-rhamnoside]

A solution of 3.3 g. of digitoxigenin-3-L-[2',3'-didesoxy-$\Delta^{2'(3')}$-rhamnoside] in 240 ml. of absolute methylene chloride is combined with 1.8 g. of m-chloroperbenzoic acid and the product is allowed to stand for 16 hours at 20° C. After this time, a iodometric titration shows that the reaction solution has absorbed 1 molar equivalent of per-acid. The reaction mixture is poured into 500 ml. of a half-saturated aqueous soduim bicarbonate solution and extracted several times with methylene chloride. The organic phase is washed with a sodium carbonate solution and subsequently washed to neutral with water. After the distillation, a residue remains which crystallizes after trituration with ether. 2.78 g. of digitoxigenin-3-L-[2',3'-didesoxy-2',3'-oxido-rhamnoside] are obtained having a melting point of 239-240° (Kofler heating) after recrystallization from acetone/methylene chloride/ether.

Typical infrared bands (measured in KBr): 3520, 3460, 3360, 1775, 1750 and 1735 (shoulders), 1715, 1620, 1040, 1025 cm.$^{-1}$.

The starting substance is prepared as follows:

Digitoxigenin - 3-[2',3'-didesoxy-$\Delta^{2'(3')}$-L-rhamnoside-4'-acetate]: A solution of 1.1 g. of digitoxigenin in 9.6 ml. of absolute tetrahydrofurane is combined with 1.8 ml. of di-acetyl-L-rhamnal as well as with 0.07 ml. of phosphorus oxychloride. After 5 hours of stirring at 20–25° C. (a warming of the reaction mixture at a temperature of more than 40° C. must be avoided, since in that case undesired by-products would form which prejudice the yield and which can be separated only with difficulty), the reaction mixture is poured on 50 ml. of water containing NaHCO$_3$ in excess, then completely extracted by means of chloroform. The extracts are washed with water and dried, and the solvents are distilled off in vacuo. A residue of about 2.5 g. of oil is remaining which crystallizes slowly after triturating with ether. The crystals are filtered off and washed with a bit of cold ether. 1.01 g. of digitoxigenin - 3 - [2',3'-didesoxy-$\Delta^{2'(3')}$-L-rhamnoside-4'-acetate] having a melting point of 137–140° C. (Kofler heating) are obtained.

Typical infrared bands: 3515, 1780, 1750, 1735, 1615, 1230, 1020, 740 cm.$^{-1}$ (measured in KBr).

Ultraviolet spectrum (methanol): $\lambda_{max}$=216–217 m$\mu$; $\epsilon$=16600.

Digitoxigenin-3-[2',3' - didesoxy-$\Delta^{2'(3')}$-L-rhamnoside]: In order to hydrolyze the 4'-acetate group, 0.99 g. of the crystallized reaction product obtained above dissolved in 32 ml. of methanol and combined at the boiling point with a solution of 297 mg. of potassium carbonate in 2.97 ml. of water. The reaction mixture is refluxed for 20 minutes then cooled to 20° C. and poured into 225 ml. of a half-saturated aqueous sodium chloride solution, which causes the separation of crystals. After standing for 16 hours, the crystals are filtered off, washed with water and dried. 0.84 g. of digitoxigenin-3-[2',3'-didesoxy-$\Delta^{2'(3')}$-L-rhamnoside] is obtained, having a melting point of 188–184° C. (Kofler heating) which is at 198–201° C. after recrystallization from acetone/ether-n-hexane.

$$[\alpha]_D^{20°} = +3.0° \text{ (chloroform; } c.=0.5)$$

(In a further batch prepared in the same way, the following value was found: $[\alpha]_D^{20°}$=+4.6°.)

Typical infrared bands (measured in KBr): 3500, 3400, 3040, 1800 (sometimes a shoulder), 1775, 1720, 1620–1625, 1085, 1020, 990, 735 cm.$^{-1}$.

Ultraviolet spectrum: $\lambda_{max}$=216–217 m$\mu$; $\epsilon$=15,100 (in methanol).

EXAMPLE 16

A solution of 3.08 g. of 19-carboxymethylene-periplogenin-5$\beta$-lactone - 3 - L - [2',3'-didesoxy-$\Delta^{2'(3')}$-rhamnoside] in 90 ml. of methylene chloride is combined with 1.43 g. of m-chloroperbenzoic acid. After standing for 24 hours at 20° C., the product is worked up as indicated in Example 1. After trituration of the residue with ether, the crystals so obtained are subjected to chromatography on Al$_2$O$_3$ "Woelm," (neutral, activity degree II; column 3.5 x 3 cm.) with methylene chloride/methanol 99:1. After a throughput of 500 ml. of the eluant, this eluant is removed in vacuo and the residue obtained is recrystallized from acetone/ether. 2.51 g. of 19-carboxymethylene-periplogenin - 5$\beta$ - lactone-3-L-[2',3'-didesoxy-2',3'-oxido-rhamnoside] having a melting point of 270° C. (Kofler heating) are obtained.

Typical infrared bands: 3450, 1775, 1750 (shoulder), 1735–1700 (large), 1615, 1065, 1040 cm.$^{-1}$.

Preparation of the starting substance:

(19-carboxymethylene-periplogenin - 5$\beta$ - lactone)-3-L-[2',3'-didesoxy-$\Delta^{2'(3')}$-rhamnoside]: 3.2 ml. of carbomethoxy-methyl-diethylphosphate are added dropwise, while stirring and cooling, to a suspension of 345 g. of sodium hydride in 19 ml. of absolute tetrahydrofurane. After the completed formation of H$_2$, this solution is added to a solution of 2 g. of k-strophanthidin in 30 ml. of absolute tetrahydrofurane. Subsequently, the whole is rinsed with 20 ml. of absolute tetrahydrofurane. After stirring for 3 hours and 35 minutes at 23° C., the reaction mixture is poured on 400 ml. of water, and extracted 5 times with chloroform. The extracts are washed with water and dried, and the solvent is distilled off. The remaining oil is re-dissolved from acetone/ether. After some time, the product which, in general, is at first obtained again in an oily form, is slowly and completely crystallized. Then the crystals are filtered off. 1.8 g. of 19-carboxymethylene-periplogenin-5$\beta$-lactone having a melting point of 240–245° C. (preceded by sintering) are obtained.

Ultraviolet spectrum: $\lambda_{max}$=215 m$\mu$, $\epsilon$=24,400.

Typical infrared bands: 3460 (often also first band at 3560 cm.$^{-1}$), 1770, 1710–1730 (large), 1615, three weak but typical coherent bands at 1290, 1270 and 1250 cm.$^{-1}$. A band at 2740–2750 cm.$^{-1}$ has disappeared.

2.8 ml. of diacetyl-1-rhamnal and 4 drops of phosphorus oxychloride are added to a solution of 2 g. of 19-carboxymethylene-periplogenin-5$\beta$-lactone in 14 ml. of absolute tetrahydrofurane (if sparingly soluble in tetrahydrofurane a corresponding amount of absolute methylene chloride can be used). After standing for 4 hours or stirring at 20° C. the darkly colored reaction mixture is poured into 200 ml. of water containing sodium bicarbonate in excess. The product is extracted several times with chloroform, the extracts are washed to neutral, dried, and the solvent is distilled off. The residue so obtained is digested with ether which causes its crystallization. 3.05 g. of 19-carboxymethylene-periplogenin-5$\beta$-lactone-3-[4'-O-acetoxy - 2',3' - didesoxy-$\Delta^{2'(3')}$-L-rhamnoside] having a melting point of 221–231° C. are obtained which show a melting point of 265–267° C. after recrystallization from methylene chloride/ether.

Typical infrared bands: 3485, 1775, 1730–1740, 1615, 1230 (strong) 1020 cm.$^{-1}$.

Ultraviolet spectrum: $\lambda_{max}$=215–216 m$\mu$, $\epsilon$=26,500.

For hydrolysis, 2.2 g. of the reaction product obtained according to (a) and having a melting point of 265–267° C. are dissolved in 70 ml. of absolute methanol. A solution of 660 mg. of potassium bicarbonate in 6.6 ml. of water is added at the boiling and the reaction mixture is refluxed for 15 minutes. Then, it is poured into 250 ml. of water, and is extracted with chloroform. After washing and drying the chloroform, it is distilled off. After digestion of the residue with ether, 1.9 g. of 19-carboxy-methylene-periplogenin - 5β - lactone-3-[2′,3′-didesoxy-Δ$^{2'(3')}$-L-rhamnoside] are obtained, which have a melting point of 202–208° C. after recrystallization from acetone/ether.

Typical infrared bands: 3450, 1775, 1700–1740 (large), 1615, 1025 cm.$^{-1}$.

Ultraviolet spectrum: λ$_{max}$=215–216 mμ, ε=23,300, [α]$_D^{20°}$=+4° (c.=0.5: HCCl$_3$).

EXAMPLE 17

A solution of 1.65 g. of k-strophanthidin-3-L-[2′,3′-didesoxy-Δ$^{2'(3')}$-rhamnoside] in 120 ml. of methylene chloride is combined with 0.9 g. of m-chloroperbenzoic acid. After standing for 18 hours at 22° C., the product is worked up as indicated in Example 1. The residue obtained is triturated with ether and recrystallized from acetone/ether. 1.04 g. of k-strophanthidin-3-L-[2′,3′-didesoxy-2′,3′-oxidorhamnoside] having a melting point of 165–168° C. (Kofler heating; preceded by sintering) are obtained.

Typical infrared bands (measured in KBr): 3470, 2750, 1775, 1735, 1710 (shoulder), 1615, 1025 cm.$^{-1}$.

Preparation of the starting compound:

A solution of 10 kg. of k-strophanthidin in 70 ml. of absolute tetrahydrofurane is combined with 15 ml. of L-rhamnal-3′,4′-di-acetate and 20 drops of phosphorus oxychloride. After 5 hours of stirring at 20–25° C. the reaction mixture is poured on water containing sodium bicarbonate in excess, and the product is extracted with chloroform. This chloroform extract is washed with water and dried with sodium sulfate. After distilling off of the solvent, an oil is obtained which is subjected to chromatography at silica gel ("Merck") (column: 3 x 25 cm.) with at first 1.5 l. of benzene and subsequently 4 l. of ether as eluant. After distilling the solvent from the ether eluate and digesting with iso-propyl ether, 11.2 g. of amorphous k-strophanthidin-3-L-[2′,3′-didesoxy-Δ$^{2'(3')}$-rhamnoside-4′-acetate] are obtained having the following typical infrared bands (measured in KBr): 3500 (pointed), 2750, 1775, 1740, 1715, (shoulder), 1230, 1030, 1005 (shoulder) cm.$^{-1}$. For hydrolyzing the 4′-acetate group a solution of 5.2 g. of k-strophanthidin-3-L-[2′,3′-didesoxy-Δ$^{2'(3')}$-rhamnoside-4′-acetate] in 168 ml. of methanol is combined with a solution of 1.6 g. of potassium carbonate in 15 ml. of water, and the reaction mixture is refluxed for 25 minutes. Subsequently, this mixture is stirred into 1.5 l. of water containing sodium chloride, and extracted with chloroform. After distilling off of the chloroform a foam remains which is digested with iso-propyl ether. 4.4 g. of amorphous k-strophanthidin-3-L-[2′,3′-didesoxy-Δ$^{2'(3')}$-rhamnoside] having an atypical melting behavior (melting range 150–155° C.) are obtained. Typical infrared bands (measured in KBr): 3470, 2750, 1775, 1735, 1710 (shoulder), 1620, 1020, 990 cm.$^{-1}$.

What is claimed is:

1. A cardenolide- or bufadienolide-3-[2′,3′-didesoxy-2′,3′-oxido-glycoside] of the formula

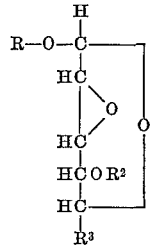

wherein R is a steroid of the 3-hydroxy-cardenolide or 3-hydroxy-bufadienolide series; R$^2$ is hydrogen, methyl, or acetyl; and R$^3$ is hydrogen, methyl, or —CH$_2$OR$^2$.

2. A compound as in Claim 1 wherein R is digitoxigenin and R$^3$ is methyl.

3. A compound as in Claim 1 wherein R is k-strophanthidin and R$^3$ is methyl.

4. A compound as in Claim 1 wherein R is 19-carboxymethylene-periplogenin-5β-lactone and R$^3$ is methyl.

5. A cardenolide-3-[2′,3′-didesoxyglycoside] of the formula

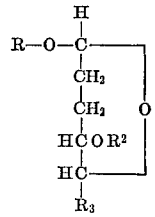

wherein R is a steroid of the 3-hydroxy-cardenolide series; R$^2$ is hydrogen, methyl, or acetyl; and R$^3$ is hydrogen, methyl, or —CH$_2$OR$^2$.

6. A compound as in Claim 5 wherein R is digitoxigenin and R$^3$ is methyl.

7. A compound as in Claim 5 wherein R is k-strophanthidin and R$^3$ is methyl.

8. A compound as in Claim 5 wherein R is 19-carboxymethylene-periplogenin-5β-lactone and R$^3$ is methyl.

9. Digitoxigenin-3-[2′,3′-didesoxy-rhamnoside].

References Cited

UNITED STATES PATENTS

| | | | |
|---|---|---|---|
| 3,136,753 | 6/1964 | Irmscher | 260—210.5 |
| 3,462,528 | 8/1969 | Voigtlander et al. | 260—210.5 |
| 3,471,614 | 10/1969 | Kaiser et al. | 260—210.5 |
| 3,639,388 | 2/1972 | Haede et al. | 260—210.5 |

OTHER REFERENCES

The Carbohydrates, Pigman, 1957, Academic Press Inc., New York, N.Y., p. 396.

Noller, Chemistry of Organic Compounds, 3rd Ed., W. B. Saunders Co., Phila., Pa., p. 598.

JOHNNIE R. BROWN, Primary Examiner

U.S. Cl. X.R.

424—182